United States Patent [19]

Inoue et al.

[11] Patent Number: 5,658,999
[45] Date of Patent: Aug. 19, 1997

[54] SYNDIOTACTIC POLYPROPYLENE WAX, PRODUCTION PROCESS THEREOF, AND HEATING ROLL FIXING-TYPE TONER COMPOSITION MAKING USE OF THE WAX

[75] Inventors: Norihide Inoue; Masahiro Kouno; Yoshiho Sonobe; Kazumi Mizutani, all of Kanagawa-ken; Tetsunosuke Shiomura, Tokyo; Nobuhiro Hirayama, Kanagawa-ken, all of Japan

[73] Assignee: Mitsui Toatsu Chemicals, Inc., Tokyo, Japan

[21] Appl. No.: 543,823

[22] Filed: Oct. 16, 1995

Related U.S. Application Data

[62] Division of Ser. No. 436,832, May 8, 1995, abandoned, which is a continuation of Ser. No. 37,423, Mar. 26, 1993, abandoned.

[30] Foreign Application Priority Data

Apr. 1, 1992 [JP] Japan .................................. 4-079551
Apr. 8, 1992 [JP] Japan .................................. 4-087083

[51] Int. Cl.$^6$ .................................. C08F 110/06
[52] U.S. Cl. .................. 526/351; 526/348; 430/99; 430/109
[58] Field of Search .................. 526/351, 348; 430/99, 109

[56] References Cited

U.S. PATENT DOCUMENTS

| Re. 31,072 | 11/1982 | Jadwin et al. . |
|---|---|---|
| 4,486,524 | 12/1984 | Fujisaki et al. . |
| 4,892,851 | 1/1990 | Ewen et al. . |
| 4,921,771 | 5/1990 | Tomono et al. . |
| 4,962,262 | 10/1990 | Winter et al. . |

FOREIGN PATENT DOCUMENTS

| 351391 | 1/1990 | European Pat. Off. . |
|---|---|---|
| 351392 | 1/1990 | European Pat. Off. . |
| 387691 | 9/1990 | European Pat. Off. . |
| 63-198691 | 8/1988 | Japan . |
| 1-203409 | 8/1989 | Japan . |
| 2-27401 | 1/1990 | Japan . |
| 2-41303 | 2/1990 | Japan . |
| 2-41305 | 2/1990 | Japan . |
| 2-167302 | 6/1990 | Japan . |
| 2-167305 | 6/1990 | Japan . |
| 2-274703 | 11/1990 | Japan . |
| 2-274704 | 11/1990 | Japan . |
| 3-84009 | 4/1991 | Japan . |
| 3-103407 | 4/1991 | Japan . |
| 3-121460 | 5/1991 | Japan . |
| 3-197516 | 8/1991 | Japan . |
| 4-20509 | 1/1992 | Japan . |
| 4-7306 | 1/1992 | Japan . |

OTHER PUBLICATIONS

Derwent Publications Ltd., JPA-3000709, Jan. 7, 1991.
Derwent Publications Ltd., JPA-3066710, Mar. 22, 1991.

*Primary Examiner*—James J. Seidleck
*Assistant Examiner*—Duc Truong
*Attorney, Agent, or Firm*—Burns, Doane, Swecker & Mathis

[57] ABSTRACT

Described herein are propylene waxes and a production process thereof. The waxes are each produced by polymerizing propylene in a reaction vessel while using a solid catalyst in the presence or absence of an organoaluminum compound. A hydrogen partial pressure of a gas phase in the reaction vessel, said gas phase being formed of the propylene and hydrogen, is maintained at 10% or higher. The solid catalyst is formed of a transition metal compound or a reaction product between the transition metal compound and an organometallic compound, an aluminoxane and a fine particulate carrier. Also described herein is a heating-roll fixing type toner composition composed essentially of a binder resin or a binder resin composition, a colorant and, as a releasing agent, the wax.

14 Claims, No Drawings

SYNDIOTACTIC POLYPROPYLENE WAX, PRODUCTION PROCESS THEREOF, AND HEATING ROLL FIXING-TYPE TONER COMPOSITION MAKING USE OF THE WAX

This application is a divisional of application Ser. No. 08/436,832, filed May 8, 1995 now abandoned, which is a continuation of application Ser. No. 08/037,423, filed Mar. 26, 1993 now abandoned.

BACKGROUND OF THE INVENTION (i) Field of the Invention

This invention relates to a polypropylene wax and its production process. Described specifically, the present invention is concerned with a polypropylene wax having a syndiotactic structure and also with a process for its production.

This invention also relates to an electrophotographic toner composition fixable by a heating roll, which toner composition uses as a releasing agent a polypropylene wax having a syndiotactic structure and is usable to develop a latent electrostatic image in electrophotography, electrostatic recording, electrostatic printing or the like.

(ii) Description of the Related Art

Low molecular-weight polypropylenes have conventionally been used as waxes in application fields such as pigment dispersants, rubber processing aids, resin processing aids, ink or dye additives, fiber treatment agents, and electrostatic copying toners. Isotactic polypropylene is now employed as a releasing agent especially for electrophotographic toner. There is, however, an outstanding demand for the development of a releasing agent suitable for use in faster copying.

Japanese Patent Laid-Open No. 41305/1990 discloses a polypropylene having relatively high syndiotacticity, which is obtained by polymerizing propylene in the presence of a catalyst system composed of a specific transition metal compound and a cocatalyst. The molecular weight of the syndiotactic polypropylene disposed in this patent publication is however so high that it is not suited as a wax.

Japanese Patent Laid-Open Nos. 274703/1990 and 274704/1990, on the other hand, disclose that the molecular weight of a syndiotactic polypropylene can be controlled by hydrogen upon production of the syndiotactic polypropylene in the presence of a catalyst system composed of a transition metal compound, which is similar to that disclosed in Japanese Patent Laid-Open No. 41305/1990 referred to above, and aluminoxane. The method disclosed in these patent publications has however been found difficult to provide a molecular weight suited for a wax.

Japanese Patent Laid-Open No. 197516/1991 discloses that an isotactic polypropylene wax can be produced by polymerizing or copolymerizing propylene in the presence of hydrogen while using a catalyst system composed of a particular metallocene and aluminoxane. The waxes disclosed in the patent publication however have a large enthalpy of melting. This patent publication also discloses a method for reducing the enthalpy of melting by increasing the content of a comonomer. This method is however accompanied by the drawback that the melting point of the wax also drops with the enthalpy of melting.

An isotactic polypropylene wax generally has a relatively high melting point as a merit, but a limitation is imposed on its utility due to its large enthalpy of melting. It has hence been desired to develop a polypropylene wax which has a relatively high melting point and a small enthalpy of melting.

In electrophotography, on the other hand, the copying speed tends to increase further in recent years to meet the ever increasing quantity of information to be dealt with. In the meantime, electrophotographic printers are finding ever-increasing utility as compact domestic copying machines and also printers for personal computers and office computers. Upon high-speed copying or printing, the quantity of heat which toner receives from a thermal fixing roll becomes smaller compared with low-speed copying or printing and, moreover, some heat is taken away by copying paper so that the surface temperature of the fixing roll is lowered considerably, leading to the problem that the fixing strength is insufficient. Such compact copying ma chines and electrophotographic printers, however, structurally do not permit use of a heating roll having a large heat capacity, whereby insufficient fixing arises. With a view toward achieving fixing with a smaller heat quantity, it has been attempted to lower the melt viscosity of toner. This has however resulted in the occurrence of offsetting so that the above problem still remains unsolved. There is hence an outstanding desire for a toner which can be fixed by a heating roll of a low heat quantity and does not develop offsetting at the fixing temperature. A great deal of work has been made accordingly, including the addition of a wax as a binder and/or a releasing agent. Especially, with a view toward simplifying the maintenance of a machine and improving the writing property of fixed paper, there is a recent move toward adopting an oilless fixing heating roll instead of the conventional system in which silicone oil is coated on a surface of a heating roll to prevent offsetting. This has resulted in an ever-increasing demand for a further improvement in offset resistance so that the role of an offset preventive in toner has become important.

Some methods are known for improved offset resistance. As disclosed, for example, in U.S. Pat. No. 4,486,524, a resin having a weight average molecular weight/number average molecular weight ratio of 3.5 to 40 and a number average molecular weight of 2,000 to 30,000 is used as a binder to provide a toner having good offset resistance. Reissued U.S. Pat. No. 31,072 discloses use of a crosslinked binder resin to broaden the fixing temperature range, thereby providing a toner which does not develop offsetting even at a relatively high fixing temperature. Each of the above methods increases the viscosity of the binder resin upon melting so that the toner can be prevented from moving toward the fixing roll. Where the conduction of heat is insufficient as in high-speed machines, these methods cause a problem in fixing strength. It is also known, as disclosed in U.S. Pat. No. 4,921,771, to improve the offsetting problem by using an isotactic polypropylene having a number average molecular weight of 3,000 to 4,000 in an amount of 1 to 10 parts by weight per 100 parts by weight of a binder resin. In a fixing system where heat is not conducted sufficiently, however, the isotactic polypropylene wax so added cannot melt so that its offset preventing effect is reduced. If the amount of the wax is increased to compensate for the melting difficulty, the particle size of the wax dispersed in the toner becomes greater and, in some worst cases, wax particles are separated from toner particles. This causes problems in the quality of pictures, such as scattering and fogging due to an abnormal charge distribution, and also the so-called filming that the wax remains on a surface of a photoconductor. This filming leads to the trouble that images can no longer be formed there.

Among polyolefins employed as wax-type releasing agents, polypropylene is considered to have greater parting effects than polyethylene so that polypropylene is employed widely. These known polypropylene waxes mainly have an isotactic structure as disclosed in Japanese Patent Laid-Open No. 203409/1989. These isotactic polypropylenes generally have a large enthalpy of melting and have poor compatibility with binder resins for toner, so that they have not overcome the problem described above. According to the method disclosed in Japanese Patent Laid-Open NO. 197516/1991, ethylene blocks are introduced to improve the enthalpy of melting. The offset resistance is however deteriorated so that this method is not preferred. Japanese Patent Laid-Open No. 20509/1992 discloses a process for the production of a thermally degraded wax, while Japanese Patent Laid-Open No. 84009/1991 discloses a wax which is obtained by thermally degrading a propylene copolymer comprising a propylene and having an isotactic structure, ethylene and a $C_4$ or higher $\alpha$-olefin. Isotactic polypropylene is however not preferred because, when subjected to thermal degradation, it forms unnecessary sticky low molecular substances and toner blocking and filming are induced. To eliminate unnecessary sticky components formed by thermal degradation, Japanese Patent Laid-Open No. 121460/1991 discloses to obtain a high-isotactic polypropylene either by washing a low molecular-weight isotactic polypropylene, which has been obtained by thermal degradation, with toluene, or by thermally degrading a high molecular-weight polypropylene having high isotacticity. The enthalpy of melting however increases with the isotacticity so that such a high-isotactic propylene is not preferred for fixing toner on a heating roll with smaller energy and for preventing offsetting.

As has been described above, the conventional polypropylene waxes have a large enthalpy of melting and poor compatibility with other polymers. They are hence not suited for use in toners which can be fixed with smaller energy as required in recent years. Therefore, there is an outstanding demand for the development of a thermally fixing toner composition, which is excellent in offset resistance and permits low-energy fixing, by using a polypropylene wax having a small enthalpy of melting and good compatibility with other polymers.

SUMMARY OF THE INVENTION

With a view toward overcoming the above-described problems and developing a polypropylene wax having a relatively high melting point and a relatively small enthalpy of melting, the present inventors have proceeded with extensive research. As a result, it has been found that the above-described object can be achieved by a low molecular-weight polypropylene whose structure is predominantly syndiotactic. It has also been found that use of the low molecular-weight polypropylene as a releasing agent in a heating-roll fixing type toner composition can provide a heating-roll fixing type toner composition having excellent offset resistance and permitting low-energy fixing. These findings have led to the completion of the present invention.

In one aspect of the present invention, there is thus provided a syndiotactic polypropylene wax having a syndiotactic pentad fraction (rrrr) of at least 0.7 as measured by $^{13}$C-NMR, a melting point (Tm) in a range of 120°–170° C. as measured by a differential scanning calorimeter (DSC), and an intrinsic viscosity ([η]) in a range of 0.01–0.4 dl/g as measured at 135° C. in a tetralin solution.

In another aspect of the present invention, there is also provided a process for the production of a syndiotactic polypropylene wax, which comprises polymerizing propylene in a reaction vessel (i) while maintaining at 10% or higher a hydrogen partial pressure of a gas phase contained in the reaction vessel and formed of the propylene and hydrogen and (ii) while using in the presence or absence of an organoaluminum compound a solid catalyst formed of:

one of (A) a transition metal compound represented by the following formula [I]:

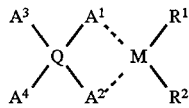

in which $A^1$ represents a cyclopentadienyl group, $A^2$ represents a fluorenyl group or a derivative thereof, $A^3$ and $A^4$ individually represent an alkyl group having 1–10 carbon atoms, an aryl group having 6–20 carbon atoms, an alkylaryl group, an arylalkyl group, a halogenated aryl group, a hydrocarbon group containing a hetero atom such as oxygen, nitrogen, sulfur or silicon, or a hydrogen atom, Q connects $A^1$ and $A^2$ to each other and represents a hydrocarbon group having 1–10 carbon atoms or a hydrocarbon group containing silicon, germanium or tin, $A^3$ and $A^4$ may be coupled together to form a ring structure among $A^3$, $A^4$ and Q, $R^1$ and $R^2$ individually represent a halogen or hydrogen atom, an alkyl group having 1–10 carbon atoms, an aryl group having 6–20 carbon atoms, an alkylaryl group or an arylalkyl group, and M represents titanium, zirconium or hafnium, or (A') a reaction product between the transition metal compound and an organometallic compound;

(B) an aluminoxane; and (C) a fine particulate carrier.

In a further aspect of the present invention, there is also provided a process for the production of a syndiotactic polypropylene wax, which comprises thermally degrading at 200°–450° C. for 0.5–10 hours a syndiotactic polypropylene having a syndiotactic pentad fraction (rrrr) of at least 0.7 as measured by $^{13}$C-NMR and a melting point (Tm) in a range of 120°–170° C. as measured by a differential scanning calorimeter (DSC).

In a further aspect of the present invention, there is also provided a heating-roll fixing type toner composition composed as essential components of a binder resin or a binder resin composition, a colorant and a releasing agent, comprising as a releasing agent a syndiotactic polypropylene wax having a syndiotactic pentad fraction (rrrr) of at least 0.7 as measured by $^{13}$C-NMR, a melting point (Tm) in a range of 120°–170° C. as measured by a differential scanning calorimeter (DSC), and an intrinsic viscosity ([η]) in a range of 0.01–0.4 dl/g as measured at 135° C. in a tetralin solution.

DETAILED DESCRIPTION OF THE INVENTION

The polypropylene wax according to this invention has a syndiotactic pentad fraction (rrrr) of at least 0.7 when determined by such a $^{13}$C-NMR analysis as described, for example, in Japanese Patent Laid-Open No. 41303/1990. Its melting point (Tm) is in a range of 120°–170° C. as measured by a differential scanning calorimeter when it was heated again subsequent to its complete melting. Its intrinsic viscosity ([η]) as measured at 135° C. in a tetralin solution is 0.01–0.4 dl/g, preferably 0.03–0.35 dl/g, more preferably 0.05–0.20 dl/g. Further, its enthalpy of melting ($\Delta H_m$) is in a range of 5–20 cal/g, preferably 5–15 cal/g, more preferably 5–13 cal/g.

The syndiotactic polypropylene wax according to this invention can also be obtained by a process for the production of a low molecular-weight isotactic propylene polymer or copolymer, for example, known thermal degradation as disclosed in Japanese Patent Laid-Open No. 84009/1991 or Japanese Patent Laid-Open No. 20509/1992.

Thermal degradation can be conducted, for example, by causing a high molecular-weight polypropylene to pass at 200°–450° C. in 0.5–10 hours through a tubular reactor or the like, which permits uniform conduction of heat, as disclosed in Japanese Patent Laid-Open No. 41305/1990 or Japanese Patent Laid-Open No. 274703/1990. The molecular weight of the resulting syndiotactic polypropylene can be controlled depending on the temperature and time of the thermal degradation. Thermal degradation temperatures lower than 200° C. requires a long time for reducing the molecular weight, whereas thermal degradation temperatures higher than 450° C. make it difficult to control the molecular weight because the degradation takes place in a short time. The syndiotactic polypropylene which is subjected to thermal degradation is not limited to propylene homopolymer but, as long as the properties of the syndiotactic polypropylene wax are not impaired, a copolymer with an olefin having 2–25 carbon atoms such as ethylene or 1-butene can also be used without problems or inconvenience.

Different from thermal degradation of an isotactic polypropylene wax, the wax obtained by the thermal degradation of the syndiotactic polypropylene has been found not to cause such a trouble as filming at all.

To produce a high-quality wax having a better color hue and containing less impurities, it is preferred to adopt a process in which a polypropylene wax is produced directly by polymerizing propylene in the presence of hydrogen while using the solid catalyst of the present invention, that is, the solid catalyst formed of a metallocene, aluminoxane and a fine particulate carrier.

In the formula [I], $A^1$ represents a cyclopentadienyl group and $A^2$ represents a fluorenyl group or a derivative thereof. Specific examples of $A^2$ include fluorenyl, 1-methylfluorenyl and 2,7-di-t-butylfluorenyl. Among these, 2,7-di-t-butylfluorenyl is preferred. $A^3$ and $A^4$ individually represent an alkyl group having 1–10 carbon atoms, an aryl group having 6–20 carbon atoms, an alkylaryl group, an arylalkyl group, a halogenated aryl group, a hydrocarbon group containing a hetero atom such as oxygen, nitrogen, sulfur or silicon, or a hydrogen atom. Specific examples of $A^3$ and $A^4$ include H, methyl, ethyl, propyl, phenyl, toluyl, fluorophenyl, methoxyphenyl and benzyl. Q connects $A^1$ and $A^2$ to each other and represents a hydrocarbon group having 1–10 carbon atoms or a hydrocarbon group containing silicon, germanium or tin, with a Si-containing hydrocarbon group being preferred. $A^3$ and $A^4$ may be coupled together to form a ring structure among $A^3$, $A^4$ and Q. In such a case, examples of the group formed of $A^3$, $A^4$ and Q include cyclopentylidene, cyclohexilidene and tetrahydropyran-4-ylidene. $R^1$ and $R^2$ individually represent a halogen or hydrogen atom, an alkyl group having 1–10 carbon atoms, a Si-containing alkyl group, an aryl group having 6–20 carbon atoms, an alkylaryl group or an arylalkyl group. Preferred specific the examples of $R^1$ and $R^2$ are Cl, methyl, phenyl, and trimetylsilylmethyl.

Specific examples of the transition metal compound represented by the formula [I] in the present invention, namely, the metallocene compound include metallocene compounds capable of yielding syndiotactic polypropylene, such as those disclosed, for example, in Japanese Patent Laid-Open Nos. 41303/1990 and 274703/1990. Also preferred for use is transition metal compounds containing as a ligand a fluorenyl group substituted by an alkyl group or the like. In particular, introduction of a bulky substituent such as t-butyl into a fluorenyl group makes it possible to improve the stereoregularity of the polymer, the stability of the catalyst and the activity of the catalyst. Specific examples of such compounds include isopropylidene (cyclopentadienyl) (2,7-di-t-butyl-9-fluorenyl)zirconium dichloride, cyclohexylidene (cyclopentadienyl) (2,7-di-t-butyl-9-fluorenyl) zirconium dichloride, diphenylmethylene (cyclopentadienyl) (2,7-di-t-butyl-9-fluorenyl)zirconium dichloride, methylphenylmethylene (cyclopentadienyl) (2,7-di-t-butyl-9-fluorenyl) zirconium dichloride. Of these compounds, a synthesis example of isopropylidene (cyclopentadienyl) (2,7-di-t-butyl-9-fluorenyl)zirconium dichloride is shown in one of examples in the present application. The other compounds can be readily synthesized in a similar manner.

The component (A') also used in the present invention can be obtained by bringing the transition metal compound represented by the formula [I] and an organometallic compound into contact to each other.

The organometallic compound can be an organometallic compound of a metal in Group 1a or 2a of the Periodic Table or an organoaluminum compound.

Organometallic compounds of a metal in Group 1a or 2a of the Periodic Table are, for example, organometallic compounds containing lithium, sodium, potassium or magnesium. Described specifically, they include methyl lithium, n-butyl lithium, t-butyl lithium, neopentyl lithium, phenyl lithium, benzyl lithium, trimethylsilylmethyl lithium, methyl magnesium chloride, butyl magnesium chloride, neopentyl magnesium chloride, benzyl magnesium chloride, and trimethylsilylmethyl magnesium chloride. Preferred specific examples include methyl lithium, neopentyl lithium, benzyl lithium, trimethylsilylmethyl lithium, methyl magnesium chloride, neopentyl magnesium chloride, benzyl magnesium chloride, and trimethylsilylmethyl magnesium chloride. These preferred organometallic compounds contain no hydrogen atom at the β-positions.

Organoaluminum compounds can be represented by the following formula [II]:

wherein $R^1$ and $R^2$ individually represent a hydrocarbon group having 1–20 carbon atoms and may be the same or different, X represents a halogen atom, O represents an oxygen atom, H represents a hydrogen atom, j stands for an integer of 1–3, l, f and m individually stand for an integer of 0–2, and j+k+l+m=3. Described specifically, trimethyl aluminum, triethyl aluminum, triisobutyl aluminum, diethyl aluminum chloride, ethyl aluminum dichloride and diisobutyl aluminum hydride can be mentioned. Among these, trimethyl aluminum, triethyl aluminum and triisobutyl aluminum are suitably employed.

Although no particular limitation is imposed on the method for bringing the transition metal compound represented by the formula [I] and the organometallic compound into contact with each other, it is preferred to have them contacted at a temperature of from −100° C. to 100° C. in an organic solvent. More preferably, they are contacted with each other at −100° C. to 50° C. in a hydrocarbon solvent such as benzene, toluene, pentane, hexane or heptane. The organometallic compound can be used in a molar amount 1.0–100 times, preferably 1.0–50 times the transition metal compound represented by the formula [I].

It is preferred to react the transition metal compound represented by the formula [I] with the organometallic compound in advance and then to use the reaction product as the component (A'), because the solid catalyst so prepared shows higher activity than that available from the use of the transition metal compound represented by the formula [I], as is, as the component (A).

The aluminoxane employed as the component (B) in the present invention can be represented by the following formula [III]:

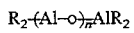

and or the following formula [IV]:

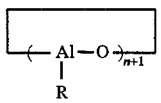

wherein R represents a hydrocarbon group having 1–10 carbon atoms and n stands for an integer of 2 or greater. Methylaluminoxanes in which R is a methyl group and n is 5 or greater, preferably 10 or greater are employed in particular. No problem will arise even if the aluminoxanes contain one or more alkylaluminum compounds to some extent. Other suitably usable aluminoxanes include aluminoxanes containing two or more kinds of alkyl groups disclosed, for example, in Japanese Patent Laid-Open Nos. 24701/1990 and 103407/1991; fine particular aluminoxanes disclosed, for example, in Japanese Patent Laid-Open No. 198691/1988; and aluminum oxy compounds obtained by contacting aluminoxanes with water or an active hydride compound, as disclosed in Japanese Patent Laid-Open Nos. 167302/1990 or 167305/1990.

The fine particulate carrier used as the component (C) in the present invention is a fine particulate, inorganic or organic carrier whose average particle size falls in a range of from 0.01 μm to 500 μm, preferably from 1 μm to 200 μm. Illustrative fine particulate inorganic carriers include metal oxides and metal chlorides. Specific examples include $SiO_2$, $Al_2O_3$, $MgCl_2$, $TiO_2$, $ZrO_2$, MgO and their complexes. Illustrative fine particulate organic carriers include organic polymers such as polyethylene, polypropylene, polystyrene and polynorbornene.

What is important in the present invention is first to make the component (A) or (A') contact with the solid catalyst component which has been obtained by treating the fine particulate carrier (C) with the atuminoxane (B). This makes it possible to produce a solid catalyst having high activity.

As a method for treating such a fine particulate carrier with the aluminoxane, it is preferred to make the fine particulate carrier and the aluminoxane contact with each other in an organic solvent or in a solventless manner. The contacting temperature is in a range of from −50° C. to 300° C., preferably from 0° C. to 200° C. No particular limitation is imposed on the organic solvent employed upon contacting reactive components together, as long as it is inert to the aluminoxane. Specific examples include aromatic and aliphatic hydrocarbons such as benzene, toluene, xylene, pentane, hexane, heptane, decane and cyclohexane. The aluminoxane can be used in an amount of 0.01–100 times by weight, preferably 0.1–10 times by weight the fine particulate carrier.

As a method for bringing the fine particulate carrier, which has been treated with the aluminoxane, into contact with the component (A) or (A'), it is preferred to have them contacted in an organic solvent or in a solventless manner. No particular limitation is imposed on the organic solvent employed upon contacting them together, as long as it is inert to the aluminoxane. Specific examples include aromatic and aliphatic hydrocarbons such as benzene, toluene, xylene, pentane, hexane, heptane, decane and cyclohexane. The contacting temperature may be in a range of from −50° C. to 100° C., preferably from 0° C. to 50° C.

The solid catalyst according to the present invention, which has been obtained as described above, contains transition metal atoms in a proportion of 0.01–20 wt. %, preferably 0.1–10 wt. % and Al atoms in a proportion of 1–50 wt. %, preferably 5–40 wt. %.

In the present invention, the solid catalyst obtained as described above can be used in the presence of an organoaluminum compound as needed.

Illustrative usable examples of the organoaluminum compound in this case include, among those represented by the formula [II], trimethyl aluminum, triethyl aluminum, triisobutyl aluminum, diethyl aluminum chloride, ethyl aluminum dichloride, and diisobutyl aluminum hydride. Of these, triethyl aluminum and triisobutyl aluminum are suitable. When polymerized in the presence of such an organoaluminum compound, polymerization activity per solid catalyst can be enhanced as described, for example, in Japanese Patent Laid-Open No. 7306/1993.

What is important in the present invention resides in the polymerization of propylene in the presence of hydrogen. This enables to produce a low molecular-weight polypropylene having properties as a wax.

Hydrogen is used in an amount sufficient to give a hydrogen partial pressure of at least 10% in a gas phase in a polymerization reactor, said gas phase being composed of propylene and hydrogen. In other words, it is desired to conduct polymerization under conditions which satisfy the following formula:

$$P_H/[P_P+P_H] \geq 0.1,$$

more preferably $$P_H/[P_P+P_H] \geq 0.2,$$

wherein $P_H$ represents a partial pressure of hydrogen and $P_P$ represents a partial pressure of propylene.

No particular limitation is imposed on the polymerization method and conditions employed in the process of the present invention. Known methods employed in the polymerization of propylene can be used. Solvent polymerization making use of an inert hydrocarbon medium, bulk polymerization conducted substantially in the absence of such an inert hydrocarbon medium, or vapor-phase polymerization can be used. The polymerization is generally conducted at a temperature in a range of from −100° C. to 200° C. under a pressure of from normal pressure to 100 kg/cm².

Examples of the hydrocarbon medium employed as a solvent upon polymerization in this invention include saturated hydrocarbons such as butane, pentane, hexane, heptane, octane, nonane, decane, cyclopentane and cyclohexane as well as aromatic hydrocarbons such as benzene, toluene and xylene.

The syndiotactic polypropylene wax according to the present invention is not limited to a homopolymer of propylene but can be a copolymer with an olefin having 2–25 carbon atoms or so, for example, ethylene or 1-butene as long as the properties as the polypropylene wax according to this invention are not impaired.

A description will next be made of the heating-roll fixing type toner composition according to the present invention.

The heating-roll fixing type toner composition according to the present invention is composed at least of a binder resin or binder resin composition, a colorant and a releasing agent. As the releasing agent, the syndiotactic polypropylene according to this invention is used.

The polypropylene was wax is used in an amount of 0.5–10 parts by weight, preferably 1–7 parts by weight per 100 parts by weight of the binder resin or binder resin composition. The releasing agent can be used by dispersing it in toto or in part in the binder resin or binder resin composition in advance. Further, copolymerization of the syndiotactic polypropylene according to this invention with another olefin is expected to make smaller a reduction in effects on offset resistance compared with copolymerization of isotactic polypropylene with another olefin.

As the binder resin or binder resin composition employed in the heating-roll fixing type toner composition according to the present invention, resins generally usable as toner binders can all be used. For example, it is preferred to use either singly or in combination acrylate ester resins, methacrylate ester resins, styrene resins, copolymerized acrylate ester-styrene resins, copolymerized methacrylate ester-styrene resins, copolymerized acrylate ester-methacrylate ester-styrene resins, copolymerized fumarate ester-styrene resins, copolymerized maleate ester-styrene resins, copolymerized styrene-butadiene resins, polyester resins and the like.

The binder resin or binder resin composition is required to be solid at room temperature and also not to develop caking even when left over for a long time. From such viewpoints, the glass transition temperature of the binder resin or binder resin composition is preferably 40° C. or higher, more preferably 50° C. or higher. From the viewpoint of small energy fixability, the binder resin or binder resin composition should preferably be softened at a temperature as low as possible. From this viewpoint, the glass transition temperature is preferably 90° C. or lower, more preferably 80° C. or lower.

Illustrative colorants include black pigments such as carbon black, acetylene black, lamp black and magnetite; as well as known organic or inorganic pigments such as chrome yellow, yellow iron oxide, hansa yellow G, quinoline yellow lake, permanent yellow NCG, molybdenum orange, vulcan orange, indanthrenes, brilliant orange GK, red iron oxide, brilliant carmine 6B, flizarin lake, methyl violet lake, fast violet B, cobalt blue, alkali blue lake, phthalocyanin blue, fast sky blue, pigment green B, malachite green lake, titanium oxide and zinc white. They may each be used in an amount of 5–250 parts by weight per 100 parts by weight of the binder.

In addition to the essential components described above, the heating-roll fixing type toner composition according to the present invention can contain, for example, polyvinyl chloride, polyvinyl acetate, polyolefins, polyesters, polyvinyl butyral, polyurethane, polyamides, rosin, modified rosin, terpene resins, phenol resins, aliphatic hydrocarbon resins, aromatic petroleum resins, paraffin wax, polyolefin wax and the like to extents not impairing the advantages of the present invention.

The toner composition according to the present invention may be selectively added, for example, with nigrosine, a known charge control agent led by a metal-containing azo dye, a pigment dispersant, a softening point lowering agent, metal powder, metal oxide powder and the like, as needed.

A mixture of the various components described above is premixed in a powdery form, kneaded in a heated and melted state in a kneader such as a hot roll, Banbury mixer or extruder, cooled, comminuted finely by means of a pulverizer, and then classified by a pneumatic classifier to collect particles, generally, in a range of 5–20 μm as a toner.

The present invention will hereinafter be described specifically by examples, in which pentad fractions, Tm, ΔHm and [η] were determined as will be described below.

Pentad fraction: The ratio of the intensity of a peak derived from syndiotactic pentad chains in each sample, said peak being observed around 20.2 ppm, to the intensity of an entire peak derived from the methyl groups of propylene chains in the sample as measured by $^{13}$C-NMR was determined and recorded as a pentad fraction.

Melting point (Tm): After each sample was heated and melted at 240° C., the sample was cooled to room temperature and then heated again at a rate of 10° C./min. Of the temperatures of endothermic peaks observed, the highest temperature was recorded as Tm.

ΔHm: The area under the endothermic peak, which was observed upon measurement of the above Tm and corresponded to the Tm, was calculated and recorded as ΔHm.

[η]: Measured at 135° C. in a tetralin solution.

EXAMPLE 1

(1) Production of Wax

Synthesis of Transition Metal Compound a. Synthesis of [isopropylidene (cyclopentadiene) (2,7-di-t-butyl-9-fluorene)]

In a 300-cm$^3$ glass flask which had been thoroughly purged with nitrogen gas, 12.0 g of 2,7-di-t-butyl-9-fluorene which had been synthesized by the process described in Synthesis, 335 (1984) were dissolved in 100 cm$^3$ of tetrahydrofuran. To the resulting solution, a solution of 44 mmol of methyl lithium in ether was added dropwise at −78° C. After completion of the dropwise addition, the reaction mixture was heated to room temperature and was stirred for 3 hours at the same temperature. A solution of 4.6 g of 6,6-dimethylfulven in 50 cm$^3$ of tetrahydrofuran was added dropwise at −78° C. to the reaction mixture. After completion of the dropwise addition, the reaction temperature was raised to room temperature, followed by stirring for 10 hours at room temperature. The reaction was terminated by adding 100 cm$^3$ of an 3.6% aqueous solution of hydrochloric acid. The ether layer was washed with water and then evaporated to dryness, whereby a reddish brown viscous liquid was obtained. The viscous liquid was recrystallized from hot acetone, whereby 12.2 g of isopropylidene (cyclopentadiene) (2,7-di-t-butyl-9-fluorene) were obtained in the form of white powder.

Physical property data of the compound so obtained are as follows:

The result of elemental analysis: $C_{29}H_{36}$

|  | C | H |
| --- | --- | --- |
| Calculated (%) | 90.63 | 9.37 |
| Found (%) | 90.51 | 9.41 | b. Synthesis of [isopropylidene (cyclopentadienyl) (2,7-di-t-butyl-9-fluorenyl)zirconium chloride]

First, the dilithium salt of isopropylidene (cyclopentadiene) (2,7-di-t-butyl-9-fluorene) was prepared by converting 10.0 g of the above-synthesized isopropylidene (cylopentadiene) (2,7-di-t-butyl-9-fluorene) with n-butyl lithium.

Next, 6.1 g of zirconium tetrachloride were suspended in 100 cm³ of methylene chloride in a 500-cm³ glass flask which had been thoroughly purged with nitrogen gas. Added at −78° C. to the suspension were 300 cm³ of a solution of the above isopropylidene (cyclopentadienyl) (2,7-di-t-butyl-9-fluorenyl) dilithium in methylene chloride which were dissolved at −78° C. After the resultant mixture was stirred at −78° C. for 4 hours, the temperature of the reaction mixture was allowed to slowly rise to room temperature at which the reaction was allowed to proceed further for 15 hours. A reddish brown solution containing a white precipitate of lithium chloride was filtered off and the filtrate was concentrated. The concentrate was then cooled at −30° C. for 24 hours, whereby 4.3 g of isopropylidene (cyclopentadienyl) (2,7-di-t-butyl-9-fluorenyl) zirconium dichloride were obtained in the form of orange crystals.

Physical property data of the compound so obtained are as follows:

The result of elemental analysis: $C_{29}H_{34}ZrCl_2$

|  | C | H | Cl |
|---|---|---|---|
| Calculated (%) | 90.63 | 9.37 | 13.0 |
| Found (%) | 90.51 | 9.41 | 12.90 |

Preparation of Solid Catalyst Component

In a 100-cm³ glass flask, 2.0 g of silica (product of Fuji-Davison Chemical, Ltd.; surface area: 300 m²/g; average particle size: 57 µm; undried product), 2.0 g of methylaluminoxane (product of TOSOHAKZO CORPORATION) and 30 cm³ of toluene were placed and then refluxed for 5 hours. The supernatant was removed by decantation and the remainder was washed thrice with 50 cm³ of toluene, whereby the methylaluminoxane treatment of silica was completed.

In a 100 cm³ glass flask, 0.15 g of the isopropylidene (cylopentadienyl) 2,7-di-t-butyl-9-fluorenyl)zirconium chloride synthesized above and 0.27 g of trimethylaluminum were brought into contact with each other in 20 cm³ of toluene so that a catalyst solution of an orange color was obtained. The catalyst solution was maintained in contact with the methylaluminoxane-treated silica for 1 hour. A purple solid so obtained was washed thoroughly with toluene and then dried to provide a solid catalyst. As a result of an analysis of the solid catalyst, it was found to contain 0.6 wt % of Zr atoms and 18.1 wt. % of Al atoms.

Polymerization

In a 1.5-dm³ autoclave which had been thoroughly purged with nitrogen gas, 10 mg of the above-prepared solid catalyst and 96 mg of triisobutyl aluminum were charged. Added next were 0.75 dm³ of liquefied propylene and hydrogen in the amount that the concentration of hydrogen in a gas phase reached 48%. After they were reacted for 1 hour at 40° C., a small amount of methanol was added to the reaction system so that the polymerization was terminated. Unreacted propylene was purged and the reaction mixture was concentrated to dryness, whereby 92.0 g of a syndiotactic polypropylene wax were obtained in the form of powder. This powder will be designated as "PP-A".

The intrinsic viscosity ([η]) of the thus-obtained powder as measured at 135° C. in a tetralin solution was 0.30 dl/g, its syndiotactic pentad fraction (rrrr) as measured by ¹³C-NMR 0.86, its melting point (Tm) as measured by a differential scanning calorimeter 139° C., its melting enthalpy (ΔHm) 10.2 cal/g, and its molecular weight distribution (Mw/Mn) as measured by gel permeation chromatography (GPC) 2.3.

(2) Preparation of Toner

Production of Binder Resin Composition

As monomers, 50 parts of styrene, 40 parts of butyl methacrylate and 2 parts of methacrylic acid were charged in a flask which had been purged with nitrogen gas. The flask was heated over an oil bath and, while maintaining the inner temperature at 120° C., the monomers were subjected to bulk polymerization for 3 hours. The polymerization degree of that bulk polymerization was 28%. Xylene (75 parts) was then added and a mixture of 1 part of azobisisobutylonitrile (AIBN) and 80 parts of xylene, said mixture having been prepared in advance, was added in five portions at intervals of 2 hours over 8 hours while maintaining the internal temperature at 90° C. The reaction was then allowed to proceed further for 2 hours so that the polymerization was completed. A polymer solution H, in which the polymer had a weight average molecular weight of 246,000 and a number average molecular weight of 30,000, was obtained.

On the side, 100 parts of xylene were charged in a flask, to which a mixture consisting of 93 parts of styrene, 5 parts of butyl acrylate, 2 parts of methacrylic acid, 6 parts of AIBN and 230 parts of xylene was continuously added dropwise over 5 hours. The reaction was then allowed to proceed further for 2 hours, whereby a polymer solution L, in which the polymer had a weight average molecular weight of 7,000 and a number average molecular weight of 3,000, was obtained.

The polymer solutions H and L were next mixed in the form of solutions at a ratio such that the polymers in the polymer solutions H and L amount to 35 parts and 65 parts, respectively. The resulting mixture was then heated in a vacuum so that xylene was eliminated. The residue was cooled and then crushed into particles having a diameter not greater than 3 mm, whereby a binder resin composition was obtained for use in examples and comparative examples of this invention. The binder resin composition had a weight average molecular weight of 91,000, a number average molecular weight of 4,400 and a glass transition temperature of 56° C.

Production of Toner

The above binder resin (100 parts) was mixed with 10 parts of carbon black ("MA-100", trade name; product of Mitsubishi KaSei Corporation) as a colorant, 2 parts of the polypropylene wax produced in this example, and 0.5–2 parts of "Spilon Black TRH" (trade name; product of Hodogaya Chemical Co., Ltd.) as a charge control agent in a Henschel mixer. After the resulting mixture was molten and kneaded through a twin-screw extruder at 130° C. (inlet) to 150° C. (outlet), the mixture was cooled, crushed, pulverized in a jet mill, and then subjected to air classification, whereby powder in a particle size range of 8–20 µm (11.5 µm on average) was collected. In the Henschel mixer, 0.15 part of colloidal silica ("AEROSIL R972", trade name; product of Nippon Aerosil Co., Ltd.) was added further to conduct fluidization treatment, whereby a heating-roll fixing type toner composition was obtained.

The amount of the charge control agent was adjusted to give a triboelectricity of −15 µC/g by blow off as measured after mixing 5 parts of the toner with 95 parts of a carrier for "EP8600" (trade name; product of MINOLTA CAMERA CO., LTD.) for 30 minutes in a twin-shell blender.

EXAMPLE 2

A toner was prepared in a similar manner to Example 1 except that the polypropylene wax was used in an amount of 4 parts.

EXAMPLE 3

(1) Production of Wax

In a similar manner to Example 1 except that the polymerization condition were changed as will be described below, a syndiotactic polypropylene wax was produced.

Polymerization

In a 5.0-dm$^3$ autoclave which had been thoroughly purged with nitrogen gas, 0.41 g of the solid catalyst prepared in Example 1 was charged. Added next were 3.0 dm$^3$ of liquefied propylene and hydrogen in the amount that the concentration of hydrogen in a gas phase reached 60%. After they were reacted at 40° C. for 1 hour, a small amount of methanol was added to the reaction system so that the polymerization was terminated. Unreacted propylene was purged and the reaction mixture was concentrated to dryness, whereby 325.0 g of a syndiotactic polypropylene wax were obtained in the form of powder. This powder will be designated as "PP-B".

The powder so obtained was found to have the following data:

[η]: 0.25 dl/g,
(rrrr): 0.86,
Tm: 140° C.,
ΔHm: 9.5 cal/g, and
Mw/Mn: 2.2.

(2) Preparation of Toner

A toner was prepared in a similar manner to Example 1 except that the wax produced in this example was employed.

EXAMPLE 4

A toner was prepared in a similar manner to Example 3 except that the wax was used in an amount of 4 parts.

EXAMPLE 5

(1) Production of Wax

In a similar manner to Example 1 except that the polymerization conditions were changed as will be described below, a syndiotactic polypropylene wax was produced.

Polymerization

In a 5.0-dm$^3$ autoclave which had been thoroughly purged with nitrogen gas, 0.41 g of the solid catalyst prepared in Example 1 was charged. Added next were 3.0 dm$^3$ of liquefied propylene and hydrogen in the amount that the concentration of hydrogen in a gas phase reached 70%. After they were reacted at 40° C. for 1 hour, a small amount of methanol was added to the reaction system so that the polymerization was terminated. Unreacted propylene was purged and the reaction mixture was concentrated to dryness, whereby 330 g of a syndiotactic polypropylene wax were obtained in the form of powder. This powder will be designated as "PP-C".

The powder so obtained was found to have the following data:

[η]: 0.15 dl/g,
(rrrr): 0.85,
Tm: 135° C.,
ΔHm: 9.1 cal/g, and
Mw/Mn: 2.0.

(2) Preparation of Toner

A toner was prepared in a similar manner to Example 1 except that the wax produced in this example was employed.

EXAMPLE 6

A toner was prepared in a similar manner to Example 5 except that the wax was used in an amount of 4 parts.

EXAMPLE 7

(1) Production of Wax

Polymerization

A syndiotactic polypropylene wax (330 g) was obtained in the form of powder in a similar manner to Example 5 except that 0.41 g of the solid catalyst prepared in Example 1 was charged in a 5.0-dm$^3$ autoclave thoroughly purged beforehand with nitrogen gas, followed by the addition of 3.0 dm$^3$ of liquefied propylene and hydrogen in the amount that the concentration of hydrogen in a gas phase reached 7%. This powder will be designated as "PP-F".

The powder so obtained was found to have the following data:

[η]: 0.73 dl/g,
(rrrr): 0.88,
Tm: 141° C.,
ΔHm: 9.7 cal/g, and
Mw/Mn: 2.2.

Thermal Degradation

The polypropylene wax PP-F so obtained was heated at 350° C. for 5 hours, whereby a thermally-degraded wax PP-G was obtained. The wax so obtained was found to have the following data:

[η]: 0.12 dl/g,
(rrrr): 0.78,
Tm: 134° C.,
ΔHm: 9.2 cal/g, and
Mw/Mn: 2.0.

(2) Preparation of Toner

A toner was prepared in a similar manner to Example 1 except the wax produced in this example was employed.

EXAMPLE 8

A toner was prepared in a similar manner to Example 7 except that the wax was used in an amount of 4 parts.

EXAMPLE 9

(1) Production of Wax

Provided was a high-molecular weight syndiotactic polypropylene, which had been obtained by polymerizing polypropylene at 20° C. for one hour in toluene solvent in the presence of a catalyst composed of isopropylidene (cyclopentadienyl) fluorenylzirconium dichloride and methylaluminoxane as disclosed in Japanese Patent Laid-Open No. 41303/1990. The (rrrr), [η] and Tm of the polypropylene were 0.91, 1.34 dl/g and 151° C., respectively. Thermal degradation of the polypropylene was conducted at 380° C. for a retention time of 60 minutes while the polypropylene was continuously passed through a tube with a static mixer installed therein. As a result, a syndiotactic polypropylene wax was obtained in the form of powder. The (rrrr), [η], Tm and ΔHm of the syndiotactic polypropylene wax were 0.92, 0.09 dl/g, 153° C. and 11.7 cal/g, respectively.

The syndiotactic polypropylene waxes of the present invention obtained in the above examples can be used for various applications owing to their relatively high melting point and small enthalpy of melting. In addition, the process of the present invention for the production of such waxes has an extremely high industrial value because it has made it possible to produce a syndiotactic polypropylene wax very efficiently.

Comparative Example 1

A toner was prepared in a similar manner to Example 1 except no releasing agent was employed.

Comparative Example 2

Designated as PP-D was an isostatic polypropylene wax (isotacticity: 85%; "Viscole 660P", trade name; product of Sanyo Chemical Industries, Ltd.), which had the lowest molecular weight among waxes commercially available as releasing agents for toner. The [η], Tm, ΔHm and Mw/Mn were 0.11 dl/g, 144° C., 20.5 cal/g and 2.93, respectively.

Using the above wax, a toner was produced in a similar manner to Example 1.

Comparative Example 4

To 100 parts of PP-D powder, 300 parts of toluene were added, followed by heating for 2 hours under reflux and stirring. The reaction mixture was then allowed to cool down to room temperature. Toluene was removed by filtration, whereby a polypropylene wax having an isotacticity of 91% was obtained. The wax so obtained will be designated as PP-E. The [η], Tm, ΔHm and Mw/Mn of PP-E were 0.12 dl/g, 144° C., 22.0 cal/g and 2.23, respectively.

Using the above wax, a toner was produced in a similar manner to Example 1.

Comparative Example 5

A toner was prepared in a similar manner to Comparative Example 4 except that the wax was used in an amount of 4 parts.

Comparative Example 6

A toner was prepared in a similar manner to Example 1 except that the polypropylene wax PP-F produced in Example 7 was used. The wax was in the form of powder, and its [η], (rrrr), Tm, ΔHm and Mw/Mn were 0.73 dl/g, 0.88, 141° C., 9.7 cal/g and 2.2, respectively.

Comparative Example 7

A toner was prepared in a similar manner to Comparative Example 6 except that the wax was used in an amount of 4 parts.

EXAMPLE 10

The toners produced in Examples 1-8 and Comparative Examples 1-7 were evaluated in accordance with the manner described below.

Evaluation of Toner (1) Wax dispersion

Each sample toner, which had been coarsely crushed subsequent to its kneading and cooling, was cut by a microtome and then observed by a scanning electron microscope. Sample toners having good dispersion without observation of particles of 1.5 μm and greater were ranked as "A", those with particles of 1.5–2 μm observed therein as "B", and those with particles greater than 2 μm observed therein as "C".

(2) Copying test

Using an electrophotographic copying machine equipped with a TEFLON-coated heating roll, "EP8600" (manufactured by MINOLTA CAMERA CO., LTD.), the offset resistance and filming tendency of each sample toner were tested in the following manner:

a. Offset Resistance

Using a solid black original of 10 cm×10 cm wide, 2,000 copies were continuously made. Scumming of the white background due to development of offset and smear on a surface of the heating roll were then observed. Sample toners developed neither scumming nor smear were ranked as "A", those with some improvements observed albeit insufficient as "B", and those without any noticeable improvements as "C".

b. Filming tendency

Using a solid black original of 10 cm×10 cm wide, 2,000 copies were continuously made. Five copies of a white original were then made. Smear of a surface of a photoconductor was then observed. Good sample toners developed no smear were ranked as "A", whereas those developed noticeable smear were ranked as "C".

The results of the evaluation are presented in Table 1.

TABLE 1

| | Toner composition | | | Copying test | |
|---|---|---|---|---|---|
| | Releasing agent | Amount (part) | Wax dispersion | Offset resistance | Filming tendency |
| Example 1 | PP-A | 2 | A | B | A |
| Example 2 | PP-A | 4 | B | B | A |
| Example 3 | PP-B | 2 | A | B | A |
| Example 4 | PP-B | 4 | A | A | A |
| Example 5 | PP-C | 2 | A | A | A |
| Example 6 | PP-C | 4 | A | A | A |
| Example 7 | PP-G | 2 | A | A | A |
| Example 8 | PP-G | 4 | A | A | A |
| Comp. Ex. 1 | None | 0 | — | C | A |
| Comp. Ex. 2 | PP-D | 2 | B | C | C |
| Comp. Ex. 3 | PP-D | 4 | B | B | C |
| Comp. Ex. 4 | PP-E | 2 | B | C | A |
| Comp. Ex. 5 | PP-E | 4 | C | B | C |
| Comp. Ex. 6 | PP-F | 2 | A | C | A |
| Comp. Ex. 7 | PP-F | 4 | A | C | A |

It is clear from Table 1 that each heating-roll fixing type toner composition according to the present invention has excellent offset resistance and very low filming tendency. In addition, it has excellent wax dispersion. Owing to the use of the syndiotactic polypropylene wax as a releasing agent, especially, for its smaller enthalpy of melting compared with conventional isotactic polypropylene, it is considered very advantageous when employed as a low-energy fixing type toner composition.

We claim:

1. A process for the production of a syndiotactic polypropylene wax having a syndiotactic pentad fraction of at least 0.7 as measured by $^{13}$C-NMR, a melting point in a range of 120°–170° C. as measured by a differential scanning calorimeter, and an intrinsic viscosity in a range of 0.01–0.4 dl/g as measured at 135° C. in a tetralin solution, which comprises polymerizing propylene in a reaction vessel (i) while maintaining at 10% or higher a hydrogen partial pressure of a gas phase contained in the reaction vessel and formed of the propylene and hydrogen and (ii) while using in the presence or absence of an organoaluminum compound a solid catalyst formed of:

one of (A) a transition metal compound represented by the following formula I:

I in which $A^1$ represents a cyclopentadienyl group, $A^2$ represents a fluorenyl group or a derivative thereof, $A^3$ and $A^4$ individually represent an alkyl group having 1–10 carbon atoms, an aryl group having 6–20 carbon atoms, an alkylaryl group, an arylalkyl group, a halogenated aryl group, a hydrocarbon group containing a hetero atom such as oxygen, nitrogen, sulfur or silicon, or a hydrogen atom, Q connects $A^1$ and $A^2$ to each other and represents a hydrocarbon group having 1–10 carbon atoms or a hydrocarbon group containing silicon, germanium or tin, $A^3$ and $A^4$ may be coupled together to form a ring structure among $A^3$, $A^4$ and Q, $R^1$ and $R^2$ individually represent a halogen or hydrogen atom, an alkyl group having 1–10 carbon atoms, an aryl group having 6–20 carbon atoms, an alkylaryl group or an arylalkyl group, and M represents titanium, zirconium or hafnium, or (A') a reaction product between the transition metal compound and an organometallic compound;

(B) an aluminoxane; and (C) a fine particulate carrier.

2. A process for the production of a syndiotactic polypropylene wax having a syndiotactic pentad fraction of at least 0.7 as measured by $^{13}$C-NMR, a melting point in a range of 120°–170° C. as measured by a differential scanning calorimeter, and an intrinsic viscosity in a range of 0.01–0.4 dl/g as measured at 135° C. in a tetralin solution, which comprises thermally degrading at 200°–450° C. for 0.5–10 hours a syndiotactic polypropylene having a syndiotactic pentad fraction of at least 0.7 as measured by NMR and a melting point in a range of 120°–170° C. as measured by a differential scanning calorimeter.

3. A heating-roll fixing type toner composition comprising a binder resin or a binder resin composition, a colorant and a releasing agent, wherein said releasing agent is a syndiotactic polypropylene wax having a syndiotactic pentad fraction of at least 0.7 as measured by $^{13}$C-NMR, a melting point in a range of 120°–170° C. as measured by a differential scanning calorimeter, and an intrinsic viscosity in a range of 0.01–0.4 dl/g as measured at 135° C. in a tetralin solution.

4. A process according to claim 1, wherein the propylene is homopolymer.

5. A process according to claim 1, wherein the propylene is a copolymer of propylene with an olefin having 2 to 25 carbon atoms.

6. A process according to claim 2, wherein the syndiotactic polypropylene is a homopolymer of propylene.

7. A process according to claim 2, wherein the syndiotactic polypropylene is a copolymer of propylene with an olefin having 2 to 25 carbon atoms.

8. The heating-roll fixing type toner composition according to claim 3, comprising between 0.5 and 10 parts by weight of the syndiotactic polypropylene per 100 parts by weight of the binder resin or binder resin composition.

9. The heating-roll fixing type toner composition according to claim 8, comprising between 1 and 7 parts by weight of the syndiotactic polypropylene per 100 parts by weight of the binder resin or binder resin composition.

10. The heating-roll fixing type toner composition according to claim 3, wherein the intrinsic viscosity is in a range of 0.03–0.35 as measured at 135° C. in a tetralin solution.

11. The heating-roll fixing type toner composition according to claim 10, wherein the intrinsic viscosity is in a range of 0.05–0.20 as measured at 135° C. in a tetralin solution.

12. The heating-roll fixing type toner composition according to claim 10, wherein the enthalpy of melting ($\Delta H_m$) is in a range of about 5–20 cal/g.

13. The heating-roll fixing type toner composition according to claim 12, wherein the enthalpy of melting ($\Delta H_m$) is in a range of about 5–15 cal/g.

14. The heating-roll fixing type toner composition according to claims 13, wherein the enthalpy of melting ($\Delta H_m$) is in a range of about 5–13 cal/g.

* * * * *

UNITED STATES PATENT AND TRADEMARK OFFICE
CERTIFICATE OF CORRECTION

PATENT NO. : 5,658,999

DATED: : August 19, 1997

INVENTOR(S) : Norihide INOUE et al

It is certified that error appears in the above-identified patent and that said Letters Patent is hereby corrected as shown below:     On the title page:

In Section [62], Related U.S. Application Data, amend "Division of Ser. No. 436,832, May 8, 1995 from "abandoned" status to read --issued as U.S. Patent No. 5,677,409 on October 14, 1997--.

In claim 2, column 18, line 5, before "NMR" insert -- $^{13}$C- --.

Signed and Sealed this

Second Day of March, 1999

Attest:

Q. TODD DICKINSON

Attesting Officer    Acting Commissioner of Patents and Trademarks